United States Patent
Cording

[15] 3,647,546
[45] Mar. 7, 1972

[54] TUBULAR-TYPE POSITIVE PLATES

[72] Inventor: Wesley Townsend Cording, Plymouth Meeting, Pa.

[73] Assignee: ESB Incorporated

[22] Filed: May 21, 1970

[21] Appl. No.: 39,433

[52] U.S. Cl. ................................136/43, 136/58
[51] Int. Cl. ................................H01m 35/04
[58] Field of Search ................136/43, 54–55, 136/58–59, 63, 147, 168–170

[56] References Cited

UNITED STATES PATENTS

| | | | |
|---|---|---|---|
| 2,896,006 | 7/1959 | Sundberg | 136/43 |
| 3,099,586 | 7/1963 | Duddy | 136/43 |
| 3,207,632 | 9/1965 | Dickover et al. | 136/16 |

*Primary Examiner*—Anthony Skapars
*Attorney*—Alfred J. Snyder, Jr., Robert H. Robinson, Raymond L. Balfour and Anthony J. Rossi

[57] ABSTRACT

A tubular-type positive plate for use in lead acid storage batteries is described having tight fitting individual sleeve of a shrinkable material surrounding and closing the end of the tube and the spine. In a first alternate, a plug within the tube provides a backup for the clamping action of the shrinkable sleeve. In a second alternate, a multiopening shrinkable sleeve is provided surrounding several or all the tubes of a single plate.

11 Claims, 5 Drawing Figures

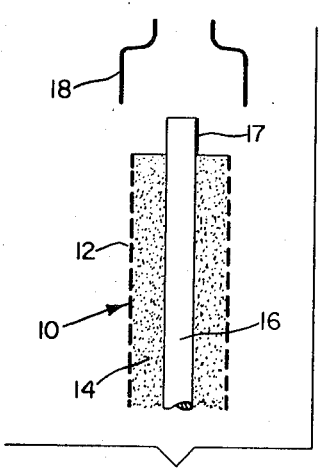
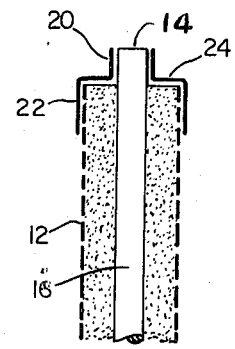
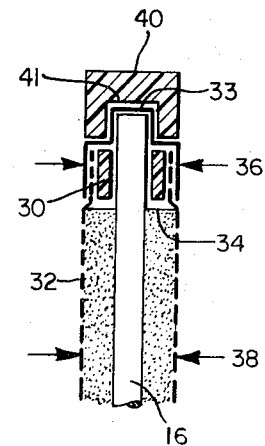
Fig. 1    Fig. 2    Fig. 3
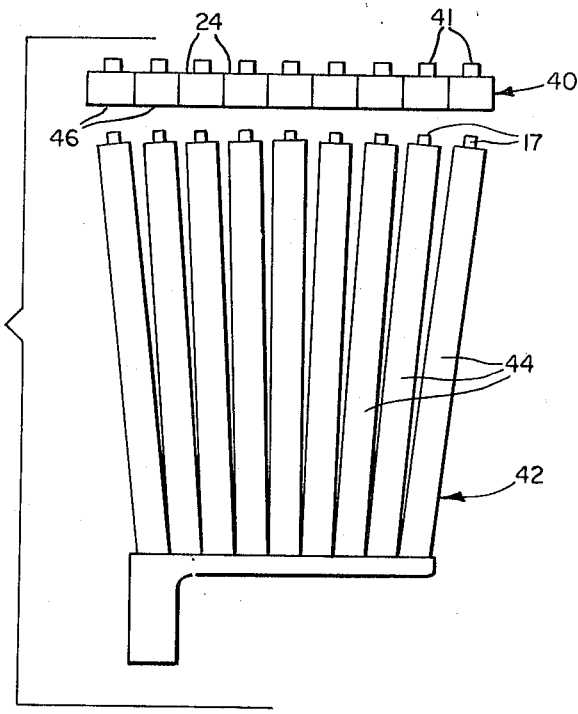
Fig. 4
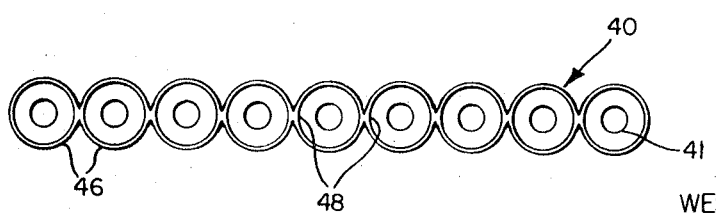
Fig. 5
INVENTOR.
WESLEY TOWNSEND CORDING

TUBULAR-TYPE POSITIVE PLATES

BACKGROUND OF THE INVENTION

1. Field of the Invention

This invention relates to secondary-type storage batteries and more particularly to lead acid storage batteries having positive plates of the tubular design.

2. Description of the Prior Art

The tubular-type lead acid battery plate has developed into a leading design.

In the tubular-type plate, the active material, lead peroxide, is contained in a series of strong porous nonmetallic tubes. Metal conductors are located at the axes of each tube and extend the entire length of the tube. The conductors or spines are fastened at the top to a top bar. At the bottom of the plate the tube ends are closed and the spines are positioned by a bottom bar. The tubes are made of braided or woven fibers or, in some cases, are of felted construction. Designs having tubes of round, oval, square and rectangular cross section have been used.

A great many storage battery manufacturers now carry the tubular-type battery lines.

Unfortunately, in spite of many preeminent features, this design has one weakness. During the life of the battery, the positive active material tends to swell and enlarge the diameter of the tubes. This enlargement of the tube diameter causes a shortening of the tube length with the result that in time an annular opening appears at the bottom of the tubes. This opening provides an easy path for active material to drop out of the plate. The result of this is that shortly after the openings appear, there is a rapid loss of active material and the useful life of the cell is ended.

In discussing some of the methods that have been tried to overcome this defect, it must be pointed out that the materials which may be used in lead acid battery construction are quite limited. Principally, the material must retain its strength in sulfuric acid and it must not exude chemicals that are harmful to the battery.

A first method for preventing the separation of bottom bar and tube is to fasten the tube to the bar with adhesive. This has failed, principally because adhesives compatible with strong acids at high temperatures are few, and those that are do not adhere to both tube and bottom bar. Another method, and one that has been successful to a point, has been to bind the tube to the bottom bar with a chemically resistant thread. Plates carefully bound up have given extremely long life and in fact, have shown the longest life that has been reported for the tubular plate. However, the cost of this operation has been too great to permit commercial use. In another construction, a socketed member is placed around the usual bottom bar clamping the tube to the bar. The great weakness of this construction is that the lips of the sockets protrude into the limited separator space between plates. With the normal vibration encountered by the battery, the sockets tend to chafe the separators and penetrate them. This provides a direct communication between positive and negative through which a lead tree can form resulting in a short circuited cell.

SUMMARY OF THE INVENTION

In this invention, a sleeve of shrinkable polymeric material is placed over and around the end of the filled tube. It is then forced to shrink around the end of the tube and the protruding spine. The portion of the sleeve over the tube shrinks tightly around the spine, thus completely closing off the end of the tube. A modified bottom bar is slipped over the sleeve where it is shrunk around the spine to keep the several tubes of the plates in alignment.

In a first modification, a cap, or sleeve, with one closed end, is placed over the tube end. When this is made to shrink, the entire end of the emergent spine is enclosed by the polymeric material.

In a second modification, individual plugs are placed on the spines so that the shrinking cap can clamp the tubes against a solid backing.

In a third modified construction, a shrinkable cap is prepared of a shape to enclose the entire plate bottom and including webs between individual tubes. The sleeve is then shrunk around tube ends. A bottom bar can be placed overall for mechanical strength. As in the first modification, plugs can be placed on the spines within the tube ends. The plugs are made smaller than the inside of the tube so that the width of the plate over the cap is no greater than the width over the normal filled tube.

There are two general classes of shrinkable polymeric materials. Both are formed or molded to a desired final size. They are then expanded. In the first class, the expansion is produced by mechanical stretching of the material. In general, the stretching will be in one dimension either diameter or length. When these materials are heated to a suitable temperature, they try to return to their original size with considerable vigor. These materials are called heat shrinkable materials. Certain polyvinyl chlorides, and cross-linked polyolefins form this class.

The second class of materials are caused to swell by soaking in an absorbable but nonreactive diluant. The absorbed material forces the molecules apart, thus making the part longer. When the diluant is allowed to evaporate, the part again tries to return to its original shape and size with considerable force. By proper choice of diluant, almost any of the common polymeric materials can be made to swell and shrink in this manner.

Either class of shrinkable material is suitable for use in the implementation of this invention.

BRIEF DESCRIPTION OF THE DRAWINGS

FIG. 1 illustrates the end of a positive tube in section prior to adding the improvement which forms this invention;

FIG. 2 shows the same parts assembled;

FIG. 3 illustrates a modification of the invention assembled with a bottom bar;

FIG. 4 shows an entire battery plate prior to application of a part which forms a further modification of the invention; and FIG. 5 shows a bottom view of the modified part.

DESCRIPTION OF THE PREFERRED EMBODIMENTS

In FIG. 1, the end of a filled tube 10 is shown in section. The tube itself, shown at 12 is made of braided glass fiber reinforced with an acid proof varnish or other construction. The tube is filled with lead oxide powder 14 to the top of the tube. A spine 16 forms the current carrying member of the tube. The spine is part of a lead alloy casting which comprises in toto a number of spines, a top bar and a lug. 18 represents a sleeve of shrinkable polymeric material, open at both ends large enough to fit over the tube 12.

In FIG. 2, the sleeve 18 has been placed on the end of the tube and has been caused to shrink tightly against the tube 12 and the emergent spine 17. This results in a configuration having a small diameter 20 around the spine, a large diameter portion 22 around the tube and a web portion 24 joining the two.

In FIG. 3, representing a first alternate construction, plug 30 is located on spine 16 inside of the tube 32. In the case of FIG. 3, a cap with closed end 33 is shown instead of the open ended sleeve of FIG. 1 so that when it is shrunk the entire end of the tube is sealed off from electrolyte. To provide room for plug 30, tube 32 is filled to a point 34 somewhat below the end of the tube 32. The size of plug 30 is such that when cap 20 has been shrunk over tube 32, the external dimension 36 and in particular the plate thickness over the cap is no greater than the external dimension 38 thickness of the body of the tube 32.

In order to hold the tube ends in place in the battery, a bottom bar 40 having sockets 41 in line with the centers of the spines is slipped over the projecting spine ends. This could be used also in the construction of FIG. 1.

FIG. 4 illustrates a multitube shrinkable cap 40 in position to place on plate 42. Cap 40 is in its expanded condition so as to provide clearance for fitting it to the several tubes 44 of plate 42. Hollow projections 41 are formed in cap 40 to take the spine ends and reduce the amount of shrink needed as shown in FIG. 1.

A bottom view of the multiple cap 40 is shown in FIG. 5. The sockets 46 are large enough to easily fit over the ends of tubes 44 and projections 41 are large enough to fit over the emergent spines 17. Webs 48 complete each circumferential wrapping about each tube so that each socket 46 is an individual member enclosing each individual tube end. Webs 24 serve to close the end of the tubes and join the sockets 46 with the projections 41.

Because of the expansion of the cap 40, the centers of the sockets 46 in the cap are greater than the centers of the tubes 44 of plate 42. In order to place cap 40 on the tubes 44, the latter must be fanned out as shown in the illustration. After the cap has been placed, it is allowed to shrink. This brings the tube ends back to the original centers and the plate is the same width at the bottom or cap end as it is at the opposite or top bar end. In this multitube design, plugs and bottom bar as shown in FIG. 3 may be used.

Having fully described my invention, I claim:

1. A tube closure for positive battery plates having porous insulating tubes containing active material and a metallic spine centrally located in each tube, the end of which emerges from the tube, which comprises:

a sleeve of insulating material having a portion of larger diameter tightly engaging the tube end, a portion of smaller diameter tightly enclosing the emergent spine and a web portion bridging the small portion and the larger portion.

2. A closure as defined in claim 1 in which the sleeve is closed at one end to completely enclose the end of the spine.

3. A closure as defined in claim 1 in which a plug of a nondeformable material is located within the end portion of the tube in which the tube end, by its tight engagement with the sleeve, is also tightly engaged by the plug located within.

4. A closure as defined in claim 1 in which the cap is comprised of shrinkable material.

5. A bottom construction for positive battery plates having at least two porous insulating tubes containing active material and a metallic spine centrally located in each tube, the end of which emerges from the tube, which comprises:
   a. a cap of insulating material on each tube having a portion of larger diameter tightly engaging the tube end, a portion of smaller diameter tightly enclosing the emergent spine, and a web portion bridging the smaller portion and the larger portion; and
   b. a bottom bar with holes therethrough, the holes enclosing the smaller diameter portion of the caps with the emergent spines therewithin.

6. A construction as defined in claim 4 in which a nondeformable plug is located within the end of each tube and in which the tube ends by their tight engagement with the caps are also tightly engaged by the plugs located within.

7. A bottom construction for positive battery plates having at least two porous insulating tubes containing active material and a metallic spine centrally located in each tube, the end of which emerges from the tube which comprises:

a multiple cap of insulating material having individual sockets for each tube, each socket having a portion of larger diameter tightly engaging the tube end, a portion of smaller diameter tightly enclosing the emergent spine and a web portion bridging the smaller portion and the larger portion.

8. A construction as defined in claim 7 in which a nondeformable plug is located within the end portion of each tube and in which the tube ends, by their tight engagement with the cap, are also tightly engaged by the plugs located within.

9. A construction as defined by claim 7 which also includes a bottom bar with holes therethrough, the holes enclosing the smaller diameter portions of the cap with the emergent spine ends therewithin.

10. A construction as defined by claim 7 in which the cap is made of a shrinkable material.

11. A construction as defined by claim 7 in which the thickness of the bottom construction is no greater than the thickness of the body of the tubes.

* * * * *